H. VON HOLTEN.
Coffee Pot.
No. 95,056.
Patented Sept. 21, 1869.
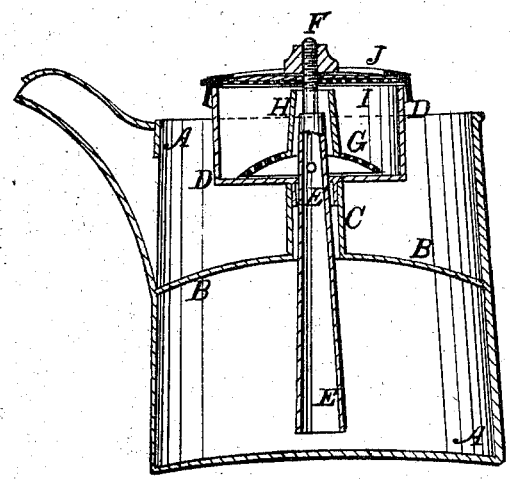

United States Patent Office.

HERMANN VON HOLTEN, OF HOBOKEN, NEW JERSEY.

Letters Patent No. 95,056, dated September 21, 1869.

IMPROVEMENT IN COFFEE-POTS.

The Schedule referred to in these Letters Patent and making part of the same.

*To all whom it may concern:*

Be it known that I, HERMANN VON HOLTEN, of Hoboken, in the county of Hudson, and State of New Jersey, have invented a new and useful Improvement in Coffee-Pots; and I do hereby declare that the following is a full, clear, and exact description thereof, which will enable others skilled in the art to make and use the same, reference being had to the accompanying drawings, forming part of this specification.

The figure is a vertical section of my improved coffee-pot.

My invention has for its object to furnish an improved coffee-pot, which shall be so constructed and arranged as to force the boiling water through the compartment containing the ground coffee, which water extracts the strength from the coffee, and flows thence into another compartment, whence it is poured out for use; and It consists in the construction and combination of the various parts of the coffee-pot, as hereinafter more fully described.

A is the body of the coffee-pot, which is divided into two compartments by the partition B, which I prefer to make convex upon its upper side and concave upon the lower side, as shown in the figure.

In the centre of the partition B is formed a hole, having an upwardly-projecting tube, C, secured in it, to prevent the contents of the upper compartment from flowing into the lower one.

D is a cup or vessel, in which the ground coffee is placed.

To the bottom of the vessel D is attached a circular flange, fitted into the mouth of the tube C.

In the centre of the bottom of the vessel D is formed a hole, in which is secured a tube, E, reaching nearly to the bottom of the vessel A.

The upper end of the tube E has a rod or bolt, F, secured in it, closely closing the upper end of said tube, said rod or bolt having a screw-thread cut upon its upper end.

In the sides of the tube E, just above the bottom of the vessel D, is formed a number of holes, as shown in the figure.

G is a convex shield, provided with an upwardly-projecting tube, H, which encloses the upper part of the tube E, and extends nearly to the top of the vessel D.

The convex shield G is perforated with numerous holes, so small as not to allow the fine coffee to pass through them.

I is a screen or filter placed upon the top of the vessel D and perforated with numerous holes.

The filter I has a hole formed through its centre, through which passes the upper end of the rod or screw F, and is kept in place by the skeleton-plate J, which has a nut formed upon or attached to its centre the screw-thread of which fits upon the screw-thread of the rod F.

A piece of flannel should be interposed between the filter I and the skeleton-plate J, to prevent the passage of the fine coffee that might pass through the said filter I.

The vessel A may be provided with a handle and with ears to enable it to be suspended over a gas burner.

The vessel A should also be provided with a cover, which I prefer to make of glass, to enable the progress of the operation to be seen through it.

In using the apparatus, the lower compartment of the vessel A is filled or nearly filled with water; the ground coffee is then placed in the vessel D, and the filter is secured in place. As the water begins to boil, the developed steam, which cannot escape, pressing upon the surface of the water, causes the said boiling water to rise through the tube E, and forces it through the ground coffee in the vessel D, whence it flows through the filter I into the upper compartment of the vessel A, whence it may be poured out as required.

Having thus described my invention,

I claim as new, and desire to secure by Letters Patent—

An improved coffee-pot formed by the combination of the partition B, tube C, rod F, vessel D, shield H, filter I, and skeleton-plate J, whether the flannel filter be used or not, with each other and with the vessel A, substantially as herein shown and described, and for the purposes set forth.

The above specification of my invention signed by me, this 28th day of July, 1869.

H. VON HOLTEN.

Witnesses:
GEO. W. MABEE,
JAMES T. GRAHAM.